US011718485B1

United States Patent
McGrath (10) Patent No.: US 11,718,485 B1
(45) Date of Patent: Aug. 8, 2023

(54) BULK CONTAINER UNLOAD

(71) Applicant: Amazon Technologies, Inc., Seattle, WA (US)

(72) Inventor: Joseph McGrath, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 76 days.

(21) Appl. No.: 17/331,001

(22) Filed: May 26, 2021

(51) Int. Cl.
*B65G 47/38* (2006.01)
*B65G 1/137* (2006.01)
*B65G 47/94* (2006.01)

(52) U.S. Cl.
CPC .......... *B65G 47/38* (2013.01); *B65G 1/1373* (2013.01); *B65G 47/94* (2013.01); *B65G 2201/04* (2013.01)

(58) Field of Classification Search
CPC ....................................................... B61D 9/14
See application file for complete search history.

(56) References Cited

U.S. PATENT DOCUMENTS

| | | | | |
|---|---|---|---|---|
| 1,893,633 A * | 1/1933 | Peterson | ................ | B65G 67/00 414/384 |
| 2,121,365 A * | 6/1938 | Pardee, Jr. | ............. | B65G 67/00 198/402 |
| 3,381,832 A * | 5/1968 | Vilagos | ................... | B65G 67/00 414/356 |
| 3,863,781 A * | 2/1975 | Butzow | .................... | B61D 9/14 414/373 |
| 11,401,120 B2 * | 8/2022 | Hartmann | ............... | B65B 69/00 |

* cited by examiner

*Primary Examiner* — William R Harp
(74) *Attorney, Agent, or Firm* — Kilpatrick Townsend & Stockton LLP (57) ABSTRACT

An inventory-handling system can receive inventory containers filled with inventory items. The inventory containers can be received between guides and advanced through the inventory-handling system. The guides can be curved to rotate the inventory containers being advanced through the inventory-handling system. The inventory containers can be rotated from an upright orientation to an inverted orientation for emptying the inventory items.

20 Claims, 5 Drawing Sheets

BULK CONTAINER UNLOAD

BACKGROUND

Modern inventory systems, such as those in mail order warehouses, supply chain distribution centers, airport luggage systems, and custom-order manufacturing facilities, face significant challenges in responding to requests for inventory items. The items can be received in the facility in containers which can include multiple items grouped together. The items can be moved around the facility in the bulk containers, however, the machinery used to move the bulk containers can be expensive and may need a large area to operate. In some approaches, the items can be manually removed from the bulk containers prior to being moved around the facility. However, manually removing the items from the bulk containers can be a time and labor intensive process.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples herein are directed to, among other things, systems and techniques relating to an inventory-handling system including an inventory unloader operable to empty out items from an inventory container. The techniques described herein may be implemented by any inventory-handling system, but particular examples described herein include an inventory-handling system with an inventory unloader that can receive inventory containers in a first end. The inventory containers can be carts or other containers that can hold and transport one or more items. The inventory containers can be received into the inventory unloader between guides (e.g., guide rails) and driven through the system by a drivetrain. The guides can be curved such that, when the inventory containers are driven from the first end of the inventory unloader to a second end of the inventory unloader, the guides rotate the containers. For example, the guides may cause the inventory containers to rotate from an upright orientation to an inverted orientation and back to an upright orientation. During rotation, the items can fall out of the inventory containers and onto an output conveyor to convey the items for further processing. For example, the items falling out of the inventory container may correspond to a bulk unloading of the inventory container at a significantly higher speed than if items were manually removed individually. At the second end of the inventory unloader, the inventory containers can be ejected from the inventory unloader.

Turning now to a particular example, in this example, the inventory-handling system can include an inventory unloader with guide rails spaced apart to contact opposing sides of the inventory containers. The inventory containers can be loaded with items and positioned for loading into the inventory unloader. The inventory unloader can receive the inventory containers between the guide rails (e.g., with the guide rails contacting opposing sides of the inventory containers). The guide rails can be curved to rotate the inventory containers as they advance through the inventory unloader. The inventory containers can be advanced through the inventory unloader with a drivetrain. The inventory containers can be received into the inventory unloader (e.g., between the guide rails) in an upright orientation. The inventory containers can be advanced through the inventory unloader (e.g., by the drivetrain) and the curvature of the guide rails can cause the inventory containers to rotate. The inventory containers can be rotated (e.g., by the curvature of the guide rails) from the upright orientation to an inverted (e.g., tipped-over, upended, or upturned) orientation. In the inverted orientation, the items can fall out of the inventory container, for example, onto an output conveyor. The inventory containers can continue to be advanced through the inventory unloader and rotated back to an upright orientation. The guide rails can be curved to rotate the inventory containers from the inverted orientation in the opposite direction the inventory containers were rotated from the upright orientation. For example, the inventory containers can be rotated 180 degrees counter-clockwise and then 180 degrees clockwise. However, the guide rails can rotate the inventory containers in the same direction they were rotated from the upright orientation to the inverted orientation. For example, the inventory containers can be rotated 360 degrees counter-clockwise. In the upright orientation, the inventory containers can be ejected from the inventory unloader. For example, the inventory containers can be ejected for use in a warehouse environment.

While exemplary embodiments are described with reference to containers (e.g., inventory containers), and the like, the systems and techniques described herein are also applicable to any other items and/or suitable packaging containers (e.g., carts, bags, boxes, bins, totes, envelopes, pouches, sacks, jugs, and other similar containers).

Figure 1:
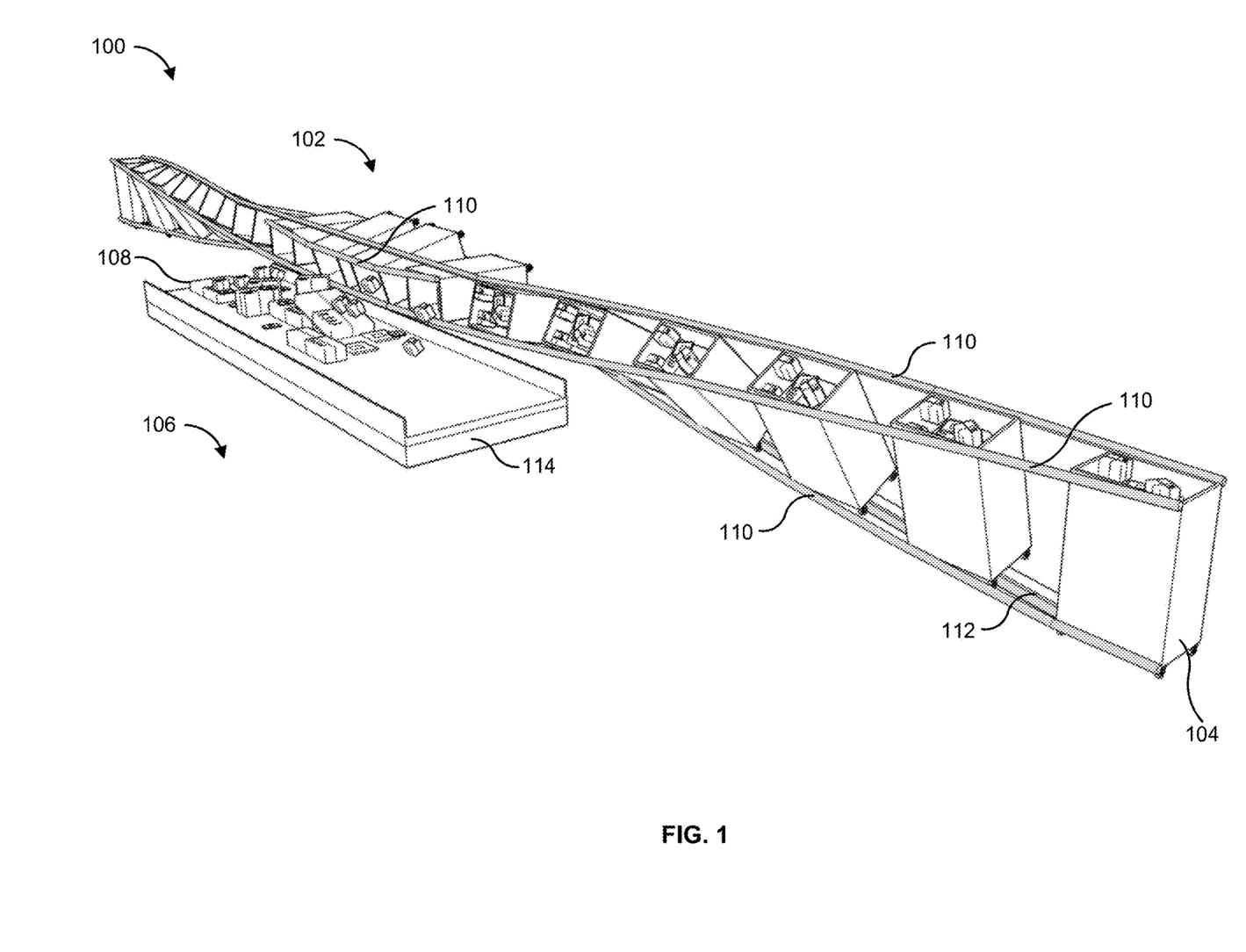
FIG. 1 illustrates an inventory-handling system that includes an unloading device which can advance and rotate inventory containers, in accordance with various embodiments.

Turning now to the figures, FIG. 1 illustrates an inventory-handling system 100, including an inventory unloader 102, for unloading inventory containers 104. The inventory-handling system 100 can be positioned in a warehouse environment 106, for example, where inventory items 108 are moved, processed, sorted, and/or stored. The inventory-handling system 100 can receive the inventory containers 104 containing the inventory items 108.

The inventory-handling system 100 can receive the inventory containers 104 into the inventory unloader 102. The inventory unloader 102 can receive the inventory containers 104 along and/or between guides 110. The inventory containers 104 can be advanced through the inventory unloader 102 by drivetrain 112. The guides 110 can act as a structure against which the inventory containers 104 rotate as the inventory containers 104 advance through the inventory unloader 102. The inventory containers 104 can be rotated from an upright orientation (e.g., with an open side facing at least partially upward) to an inverted orientation (e.g., with an open side facing at least partially downward). In the inverted orientation, the inventory containers 104 can be emptied. For example, the inventory items 108 can fall out of the inventory containers 104. The inventory items 108 can fall out of the inventory containers 104 onto an output conveyor 114. The output conveyor 114 can convey the inventory items 108 around the warehouse environment 106 (e.g., for further processing).

The now empty inventory containers 104 can continue to be advanced through the inventory unloader 102. The inventory containers 104 can be rotated by the guides 110 from the inverted orientation to the upright orientation. The inventory containers 104 can be rotated in the same direction they were rotated from the upright orientation to the inverted orientation, however, the inventory containers 104 may be rotated in the opposite direction from the direction they were rotated from the upright orientation to the inverted orientation. In the upright orientation, the inventory containers 104 can be ejected from the inventory unloader 102. For example, the inventory containers 104 can be ejected into the warehouse environment 106.

Figure 2:
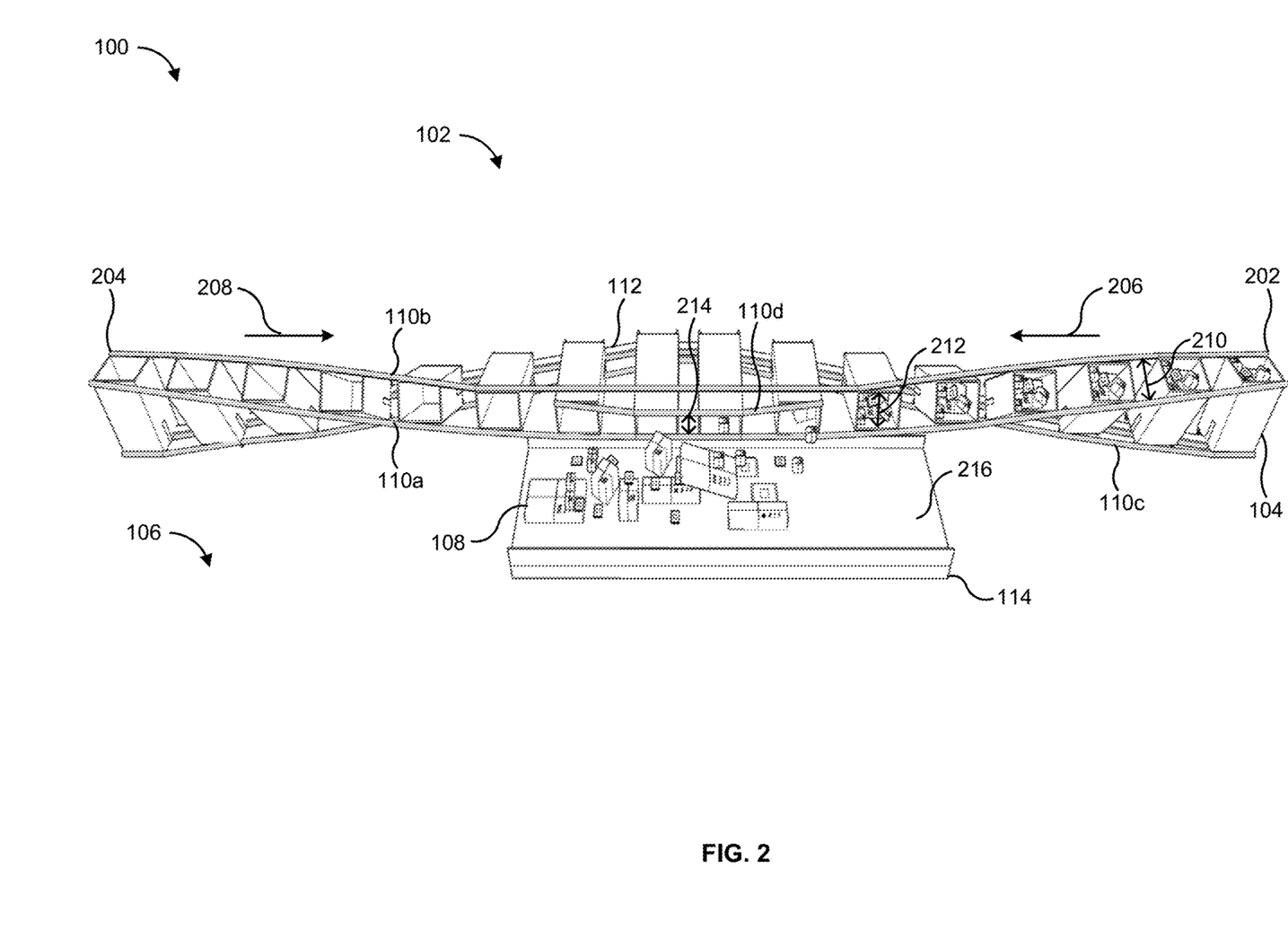
FIG. 2 is a detailed view of the inventory-handling system of FIG. 1, in accordance with various embodiments.

Turning to FIG. 2, a detailed view of the inventory-handling system 100 is shown. The inventory-handling system 100 can include an inventory unloader 102 which can receive inventory containers 104. The inventory containers 104 can be positioned in the warehouse environment 106 (e.g., in a queue) for loading into the inventory unloader 102. However, the inventory containers 104 may be loaded directly into the inventory unloader 102 (e.g., can be received from outside the warehouse environment directly into the inventory unloader 102).

The inventory unloader 102 can receive the inventory containers 104. The inventory unloader 102 can receive the inventory containers 104 in a first end 202 or a second end 204. The inventory unloader 102 can receive the inventory containers 104 and move the inventory containers 104 along at least a portion of the length of the inventory unloader 102 (e.g., in direction 206 and/or direction 208). For example, the inventory unloader 102 can receive the inventory containers 104 in the first end 202 and move the inventory containers 104 in direction 206 (e.g., to the second end 204). However, the inventory unloader 102 can receive the inventory containers 104 in the second end 204 and move the inventory containers 104 in direction 208 (e.g., to the first end 202). In some embodiments, the inventory containers 104 can be moved in a first direction when filled with inventory items 108 and moved in a second direction after the inventory items 108 have been emptied. For example, the inventory containers 104 can be received into the first end 202 and moved in direction 206 until the inventory items 108 are emptied. The now empty inventory containers 104 can then be moved in direction 208 and ejected back out of the first end 202.

The inventory containers 104 can be received in an upright orientation (e.g., with an open side facing upward). The inventory containers 104 can include containers which can contain one or more inventory items 108. The inventory containers 104 can include rigid or semi-rigid material, for example, plastic, cardboard, paper, or any suitable material which can be formed into a container to contain inventory items 108.

The inventory containers 104 can be received between guides 110 (e.g., guide rails). For example, guides 110 can be positioned to contact opposing sides of the inventory containers 104 (e.g., the guides 110 can be separated by distance 210 that is substantially the same as the width 212 of the inventory containers 104). However, the distance 210 can be slightly smaller than width 212 such that the guides can put pressure on the sides of the inventory containers 104 (e.g., pinch the inventory containers 104). Distance 210 can remain substantially the same across the length of the inventory unloader 102. For example, The guides 110 can be shaped (e.g., curved) to rotate the inventory containers 104 as the inventory containers 104 proceed through the inventory unloader 102 (e.g., from the upright orientation to the inverted orientation). For example, the guides 110 can be curved to rotate the inventory containers 104 in a counter-clockwise direction. The guides 110 can rotate the inventory containers 104 from the upright orientation (e.g., with the open side facing upward) to an inverted orientation (e.g., with the open side facing downward). In the inverted orientation, the inventory container 104 can be completely rotated (e.g., rotated 180 degrees relative to the upright position. However, the inverted orientation of the inventory container 104 can be a rotation of 90 degrees to 180 degrees relative to the upright orientation. While being advanced, the inventory containers 104 can rub against the guides 110 and the curvature of the guides 110 can cause the inventory containers 104 to rotate.

The guides 110 can be curved to rotate the inventory containers 104 in a first direction when the inventory containers 104 contain inventory items 108 and to rotate the inventory containers 104 in a second direction when the inventory containers 104 are empty. For example, the guides 110 can be curved to rotate the inventory containers 104 in a counter-clockwise direction when the inventory containers 104 contain inventory items 108 and can rotate the inventory containers 104 in a clockwise direction after the inventory containers 104 have been emptied. However, the guides 110 can be curved to rotate the inventory items 108 in any suitable direction and/or in multiple directions.

The inventory containers 104 can continue to be advanced from the inverted orientation to the upright orientation. In the upright orientation, the inventory containers 104 can be ejected from the inventory unloader 102. For example, the inventory containers 104 can be ejected into the warehouse environment 106. However, the inventory containers 104 may be ejected outside of the warehouse environment 106.

The inventory unloader 102 can include any suitable number of guides 110. The guides 110 can vary in length, size (e.g., thickness), and/or material. The guides 110 can vary in material and/or thickness based on the shape (e.g., the curvature) of the guides 110. For example, the guides 110 can include a stronger material and/or can be thicker at positions where engaging and/or supporting the inventory containers 104 that still contain inventory items 108. Additionally or alternatively, the guides 110 can be thicker and/or include stronger material at positions where supporting the inventory containers 104 during rotation. In various embodiments, the number of guides 110 can depend on the shape (e.g., the curvature) of the guides 110. For example, additional guides 110 can be positioned to aid in the rotation of the inventory containers 104.

In various embodiments, the inventory unloader 102 can include two upper guides 110a, 110b and a lower guide 110c. The two upper guides 110a and 110b can be separated by distance 210 which can be substantially the same as the width 212 of the inventory containers 104. The guides 110a, 110*b*, and 110*c* can be curved to rotate the inventory containers 104 while they travel through the inventory unloader 102.

One or more guides 110 can extend only a portion of the length of the inventory unloader 102. For example, guide 110*d* can extend only a portion of the inventory unloader 102. In some embodiments, one or more guides 110 can be or include a catch rail (e.g., guide 110*d*). The catch rail (e.g., guide 110*d*) can hold an edge of the inventory containers 104 when the inventory containers are in the inverted orientation. For example, guide 110*d* can be positioned away from guide 110*a* by a distance 214, which can be smaller than the width 212 of the inventory containers 104 and/or the distance 210 between the two upper guides 110*a* and 110*b*. The guide 110*d* can engage with an edge of the inventory containers 104 and prevent the inventory containers 104 from falling (e.g., onto the output conveyor 114) when in the inverted orientation. The distance 214 can be large enough to allow inventory items 108 to fall out of the inventory containers 104 in a space below the guide 110 (e.g., onto the output conveyor 114). The catch rail (e.g., guide 110*d*) can additionally or alternatively retain the inventory containers 104 against the drivetrain 112. For example, the guide 110*d* can prevent the inventory containers 104 from disengaging with the drivetrain 112 when they are in the inverted orientation.

In various embodiments, the guides 110 can be supported by a support structure. The support structure can support the guides 110, for example, to maintain the curvature of the guides 110. The support structure can be attached to the ground of the warehouse environment 106 and/or may be hung from above. The support structure can be or include metal, bamboo, plastic, carbon fiber, and/or any suitable rigid material.

The inventory containers 104 can be advanced through the inventory unloader 102 by a drivetrain 112. The drivetrain 112 can engage with the inventory containers 104 and advance the inventory containers 104 through the inventory unloader 102. The drivetrain 112 can engage with the inventory containers 104, for example, to advance the inventory containers 104 through the inventory unloader 102. The drivetrain 112 can be curved, for example, to correspond to the curvature of the guides 110. As discussed further, in reference to FIG. 3, the drivetrain 112 can be curved such that a portion of the drivetrain 112 remains in contact with the inventory containers 104 (e.g., the drivetrain 112 remains in contact with the bottom of the inventory containers 104) as the inventory containers 104 are advanced through the inventory unloader 102.

The inventory containers 104 can be rotated from the upright orientation to the inverted orientation to empty the inventory items 108. The inventory items 108 can be emptied from the inventory containers 104 by falling out of the open side of the inventory containers 104. In some embodiments, the inventory containers 104 can include one or more features to aid in emptying the inventory items 108. For example, the inventory containers 104 can include a nonstick surface that allows the inventory items 108 to more easily slide out of the inventory containers 104. The inventory items 108 can be received by an output conveyor 114.

The output conveyor 114 can output the inventory items 108 to other positions in the warehouse environment 106, for example, for further processing. The output conveyor 114 can include a conveyance surface 216 for receiving the inventory items 108. The conveyance surface 216 can be or include a belts, rollers, powered rollers, and/or any suitable surface for receiving and/or conveying inventory items 108.

Figure 3:
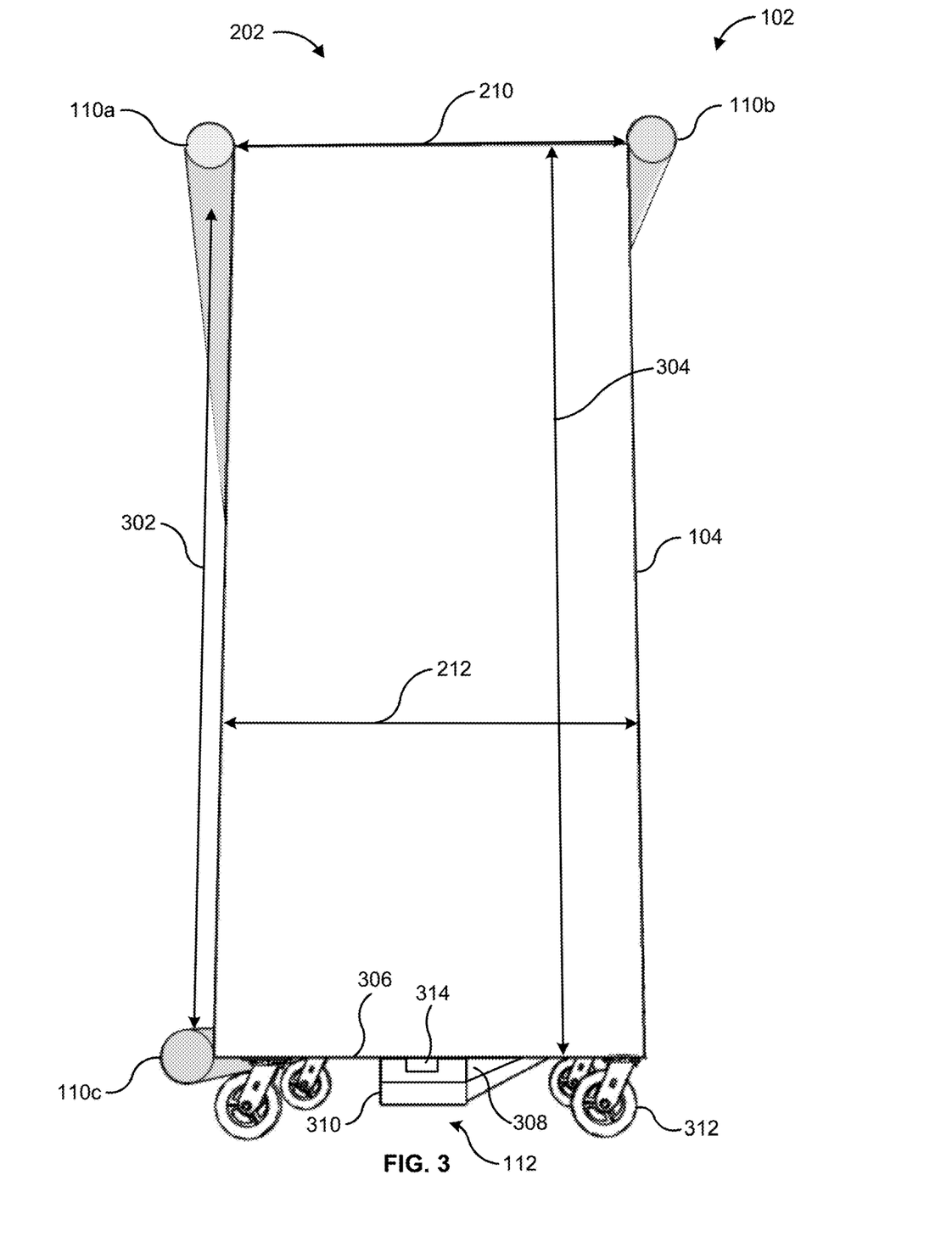
FIG. 3 is an end view of the inventory-handling system of FIG. 1, in accordance with various embodiments.

Turning to FIG. 3, FIG. 3 is an end view of the inventory-handling system 100 of FIG. 1 is shown. An inventory container 104 can be inserted into the first end 202 of the inventory unloader 102. The inventory container 104 can be inserted between guides 110*a*, 110*b*, and 110*c*. The guides 110*a* and 110*c* can be separated by a distance 302 that is less than or substantially the same as the height 304 of the inventory container 104. Additionally or alternatively, the guides 110*a* and 110*b* can be separated by a distance 210 that is less than or substantially the same as the width of the inventory container 104. The distance 302 can be less than the height 304 to support the inventory container 104 when the inventory container 104 is on its side (e.g., while the inventory container 104 is being rotated).

The bottom 306 of the inventory container 104 can be engaged with the drivetrain 112. The drivetrain 112 can include multiple portions. For example, the drivetrain 112 can include a moveable portion 308 and a support portion 310. The moveable portion 308 can remain in contact with the bottom 306 and advance the inventory container 104 through the inventory unloader 102. The moveable portion 308 can be or include a belt, chain, or any suitable material for engaging with the inventory container 104. The support portion 310 can support the moveable portion 308 and maintain the curvature of the drivetrain 112. For example, the support portion 310 can maintain the curvature of the moveable portion 308 such that the moveable portion 308 remains in contact with the bottom 306 of the inventory container 104.

In various embodiments, the inventory container 104 and/or the drivetrain 112 can include an attachment device 314. The attachment device 314 can attach the inventory container 104 with the drivetrain 112. The attachment device 314 can be or include, structure, a projection, a recess, a hook, a loop, and/or any suitable attachment device. In some embodiments, the attachment device 314 can be or include an extension of the moveable portion 308 that can engage with the inventory container 104. In further embodiments, the attachment device 314 can be or include a projection that can engage with an opening in the moveable portion 308. For example, the attachment device 314 can be or include a hook that can engage with an opening in the moveable portion 308.

In some embodiments, the inventory container 104 can include wheels 312 and/or a propulsion device. The wheels 312 can be used to move the inventory containers 104, for example, around the warehouse environment 106. The propulsion device which can be used to move the inventory container 104. For example, the propulsion device can be used to move the inventory container 104 around the warehouse environment 106 and/or align the inventory container 104 with first end 202 or the second end 204 of the inventory unloader 102. In use, the wheels 312 may facilitate movement of the inventory containers 104 along a floor and into engagement with the guides 110. During movement through the inventory unloader 102, the wheels 312 begin in a state of engagement with the floor, move out of engagement with the floor and up into the air during rotation for unloading the inventory containers 104, and move back into engagement with the floor through further rotation, for example.

Figure 4:
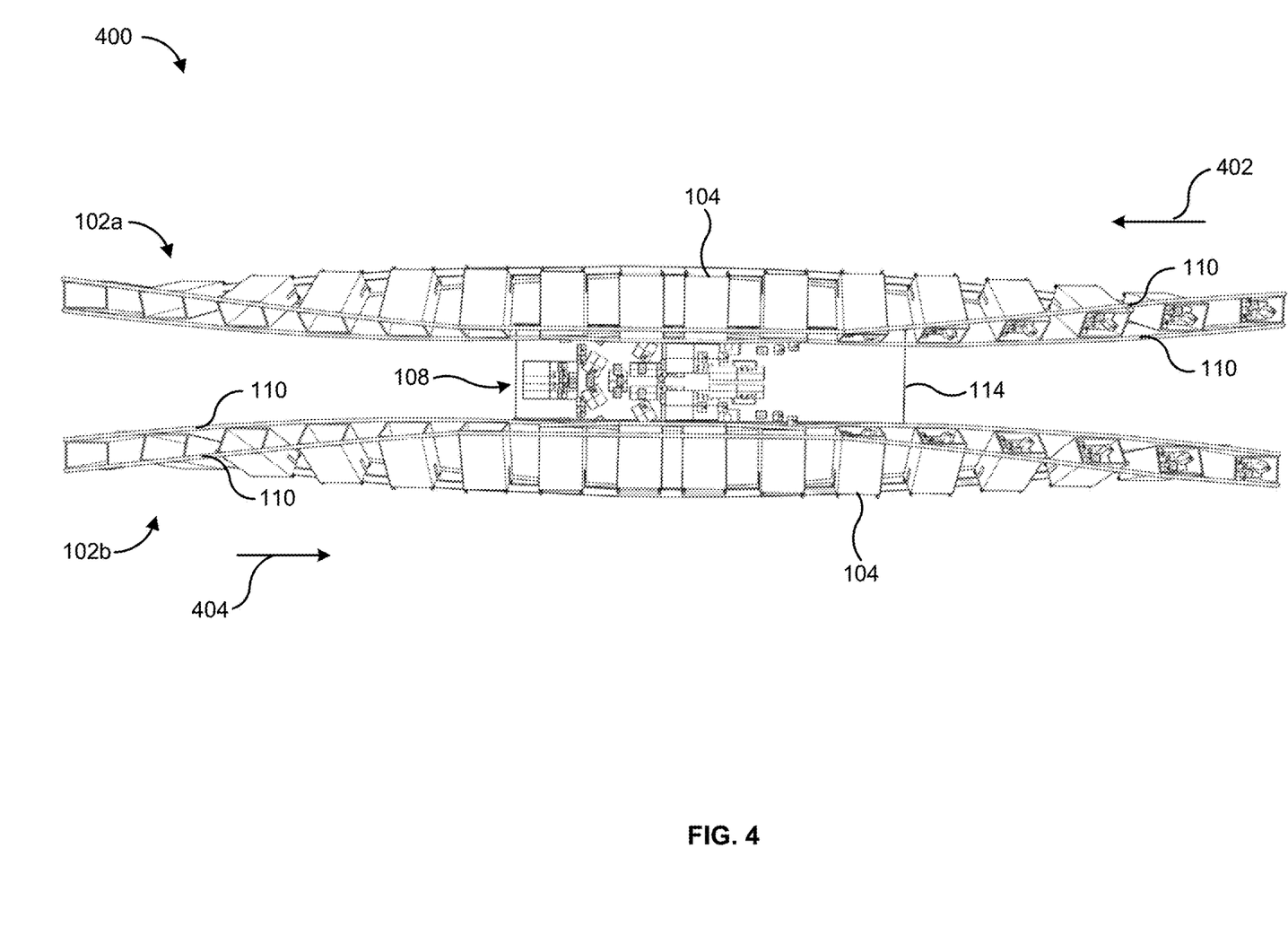
FIG. 4 illustrates the inventory-handling system of FIG. 1 with multiple conveyance devices, in accordance with various embodiments.

Inventory-handling systems 100 can include multiple inventory unloaders 102. FIG. 4 illustrates an example inventory-handling system 400 with two inventory unloaders 102*a* and 102*b*. The inventory unloaders 102*a*, 102*b* can receive inventory containers 104 in the same end and advance them in the same direction. For example, the inventory unloaders 102 can receive the inventory containers 104 and advance them in direction 402. However, the inventory unloaders 102a, 102b can advance the inventory containers 104 in opposing directions. For example, inventory unloader 102a can advance the inventory containers 104 in direction 402 and inventory unloader 102b can advance the inventory containers 104 in direction 404. The inventory unloaders 102 can advance the inventory containers 104 to deposit inventory items 108 onto output conveyor 114. The inventory items 108 can be deposited onto the same output conveyor 114, however, the inventory items 108 may be deposited onto multiple output conveyors 114. For example, the inventory unloaders 102a, 102b can deposit the inventory items 108 onto their own output conveyor 114.

Figure 5:
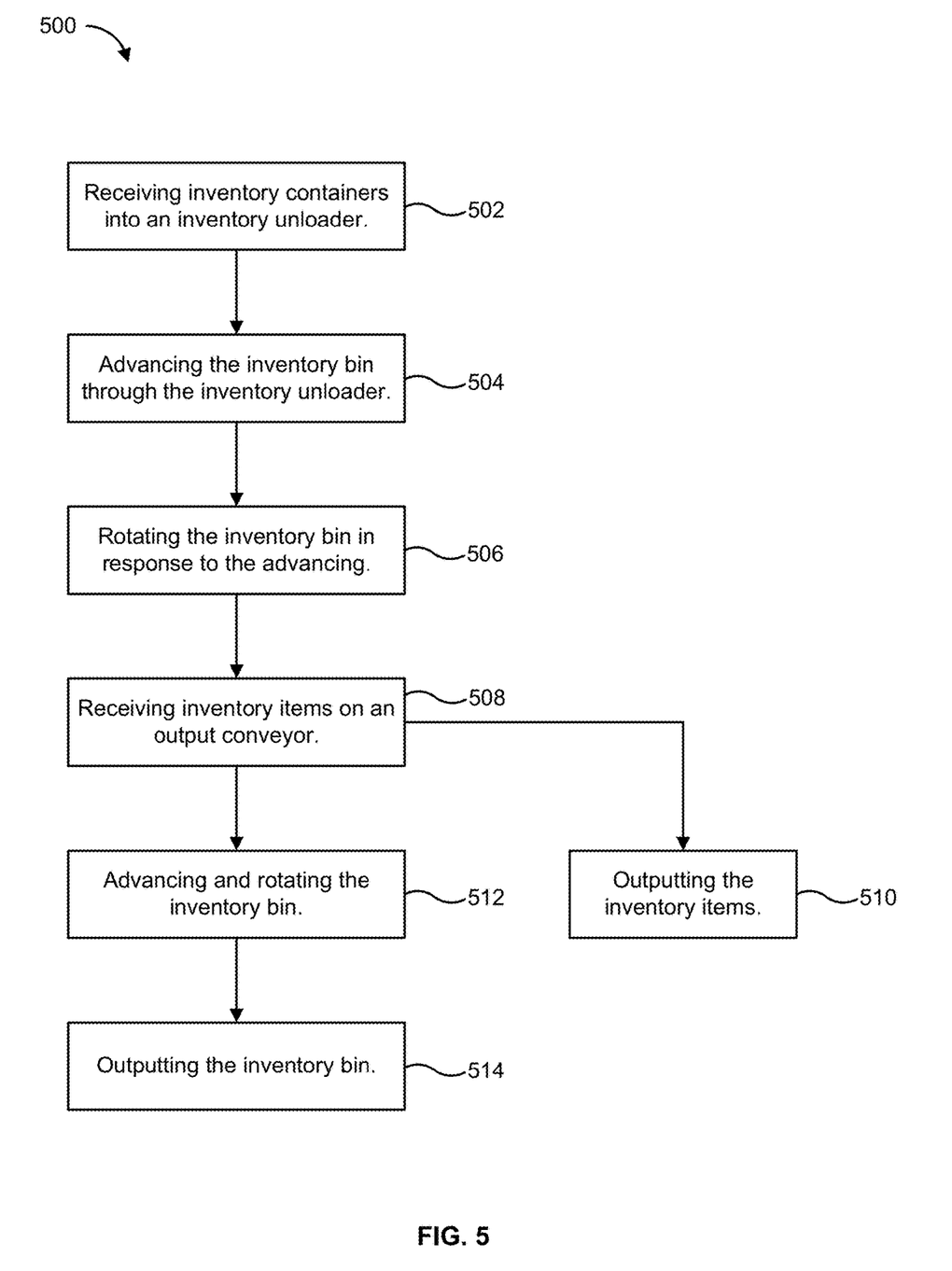
FIG. 5 illustrates a flowchart illustrating a process for moving inventory containers using an inventory-handling system as described herein, in accordance with various embodiments.

FIG. 5 is a flowchart illustrating a process 500 for unloading inventory items (e.g., inventory items 108) from inventory containers (e.g., inventory containers 104) using an inventory unloader (e.g., inventory unloader 102). Various blocks of the process 500 are described by referencing components discussed herein, however, additional and/or alternative components may be used with the process 500. The process 500 can be completed in the order shown (e.g., 502 through 514), however, the process 500 may be completed in any order.

The process 500 at block 502 can include receiving inventory containers 104 into the inventory unloader 102. The inventory containers 104 can be received by the inventory unloader 102 in an upright orientation (e.g., with an open side on top). The inventory containers 104 can be received between guides (e.g., guides 110). The guides 110 can contact opposing sides of the inventory containers 104. For example, the guides 110 can be spaced substantially the same distance as the width of the inventory containers 104 and can put pressure on the sides of the inventory containers 104 (e.g., to stabilize the inventory containers 104).

The process 500 at block 504 can include advancing the inventory containers 104 through the inventory unloader 102. The inventory containers 104 can be advanced through the inventory unloader 102. For example, the inventory containers 104 can be advanced with the drivetrain 112.

The process 500 at block 506 can include rotating the inventory containers 104 in response to the advancing. The inventory containers 104 can be rotated by the guides 110. For example, the guides 110 can be curved and advancing the inventory containers 104 can cause the inventory containers 104 to rub against the guides 110 and follow the curvature of the guides 110 to rotate to an inverted orientation (e.g., with the open side on the bottom). The inventory containers 104 can be rotated in a clockwise or counter-clockwise direction.

The process 500 at block 508 can include receiving the inventory items 108 on an output conveyor (e.g., output conveyor 114). The output conveyor 114 can receive the inventory items 108 from the open side of the inventory container 104. For example, the inventory items 108 can fall out of the open side of the inventory container 104 onto the output conveyor 114.

In various embodiments, the process 500 at block 510 can include outputting the inventory items 108. The inventory items 108 can be output by the output conveyor 114 for further processing. For example, the inventory items 108 can be output to a warehouse environment (e.g., warehouse environment 106). The action at block 510 may occur in parallel with the action in block 512.

The process 500 at block 512 can include advancing and rotating the inventory containers 104. The inventory containers 104 can be advanced in the same direction they were advanced to empty the inventory items 108. However, the inventory containers 104 may be advanced in the opposite direction they were advanced to empty the inventory items 108. Additionally or alternatively, the inventory containers 104 can be rotated in the same direction they were rotated before the inventory items 108 were emptied (e.g., 180 degrees counter-clockwise and then another 180 degrees counter-clockwise). However, the inventory containers 104 may be rotated in the opposite direction they rotated before the inventory items 108 were emptied (e.g., 180 degrees counter-clockwise and then 180 degrees clockwise).

The process 500 at block 514 can include outputting the inventory containers 104. For example, the inventory containers 104 can be output into the warehouse environment 106. The inventory containers 104 can be output by the drivetrain 112. For example, the drivetrain 112 can advance the inventory containers 104 with enough force to cause the inventory containers 104 to advance beyond the end of the guides 110.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An inventory-handling method comprising:
receiving an inventory container containing items into an inventory-handling apparatus positioned in a warehouse environment, the inventory-handling apparatus comprising a drivetrain and guide rails, the guide rails engageable with opposing sides of the inventory container and having a curvature such that the guide rails cause the inventory container to rotate between an upright orientation and an inverted orientation when the drivetrain advances the inventory container through the inventory-handling apparatus;
advancing, with the inventory container engaged with the guide rails, the inventory container through the inventory-handling apparatus by operation of the drivetrain, the advancing causing the inventory container to rotate from the upright orientation to the inverted orientation in response to the curvature of the guide rails, wherein when the inventory container is in the inverted orientation, the items fall from the inventory container, wherein when the inventory container is in the inverted orientation, an upper portion of the inventory container engages with a catch rail configured to retain the inventory container against the drivetrain; and
receiving, on an output conveyor, the items falling from the inventory container, the output conveyor configured to receive and transport the items.

2. The method of claim 1, further comprising, after the items have fallen from the inventory container, advancing the inventory container from the inverted orientation to the upright orientation with the drivetrain.

3. The method of claim 2, further comprising advancing the inventory container in the upright orientation out of the inventory-handling apparatus into the warehouse environment.

4. The method of claim 1, wherein advancing the inventory container comprises engaging the inventory container with an engagement portion of the drivetrain and advancing the engagement portion of the drivetrain.

5. The method of claim 1, wherein at least one of:
the guide rails comprise first and second guides configured to engage with respective first and second opposing sides of the inventory container, wherein the first and second guides are separated by a distance less than or equal to a width of the inventory container; or
the drivetrain comprises a moveable portion configured to engage with the inventory container and a support portion curved to retain the moveable portion against the inventory container while the inventory container advances through the inventory-handling apparatus.

6. An inventory-handling system comprising:
a guide structure positioned to engage with an inventory container, the guide structure shaped such that advancing the inventory container along a length of the guide structure causes the inventory container to rotate between an upright orientation and an inverted orientation; and
a drivetrain engagable with the inventory container and configured to advance the inventory container along the length of the guide structure to cause the inventory container to rotate between the upright orientation and the inverted orientation, wherein the drivetrain comprises a moveable portion configured to engage with the inventory container and a support portion curved to retain the moveable portion against the inventory container while the inventory container advances through the inventory-handling system.

7. The inventory-handling system of claim 6, wherein the guide structure comprises first and second guides configured to engage with respective first and second opposing sides of the inventory container.

8. The inventory-handling system of claim 6, wherein at least one of:
the guide structure comprises first and second guides configured to engage with respective first and second opposing sides of the inventory container, wherein the first and second guides are separated by a distance less than or equal to a width of the inventory container; or
when the inventory container is in the inverted orientation, an upper portion of the inventory container engages with a catch rail configured to retain the inventory container against the drivetrain.

9. The inventory-handling system of claim 6, wherein the guide structure comprises curved guide rails.

10. The inventory-handling system of claim 6, further comprising an output conveyor having a conveyance surface configured to receive items from the inventory container in the inverted orientation.

11. The inventory-handling system of claim 6, further comprising an inventory container having wheels.

12. The inventory-handling system of claim 6, wherein the drivetrain comprises an attachment device configured to engage with the inventory container.

13. An inventory-handling method comprising:
receiving an inventory container in an inventory-handling apparatus comprising a guide engageable with the inventory container and having a curvature, wherein the guide comprises first and second guides configured to engage with respective first and second opposing sides of the inventory container, wherein the first and second guides are separated by a distance less than or equal to a width of the inventory container; and
advancing, with the inventory container engaged with the guide, the inventory container through the inventory-handling apparatus, the advancing causing the inventory container to rotate from an upright orientation to an inverted orientation in response to the curvature of the guide.

14. The inventory-handling method of claim 13, further comprising advancing the inventory container causing the inventory container to rotate from the inverted orientation to the upright orientation in response to the curvature of the guide.

15. The inventory-handling method of claim 14, further comprising advancing the inventory container in the upright orientation out of the inventory-handling apparatus.

16. The inventory-handling method of claim 13, wherein advancing the inventory container through the inventory-handling apparatus comprises engaging the inventory container with a drivetrain and operating the drivetrain to advance the inventory container.

17. The inventory-handling method of claim 13, wherein receiving the inventory container in the inventory-handling apparatus comprises receiving the inventory container between two guides, each of the guides engaging a side of the inventory container.

18. The inventory-handling method of claim 13, wherein the inventory container comprises items and the method further comprises receiving, on an output conveyor, the items falling from the inventory container.

19. The inventory-handling method of claim 13, wherein advancing the inventory container causes the inventory container to rotate between 90 and 180 degrees relative to the upright orientation.

20. The inventory handling method of claim 13, wherein at least one of:
  when the inventory container is in the inverted orientation, an upper portion of the inventory container engages with a catch rail configured to retain the inventory container against a drivetrain engageable for advancing the inventory container; or
  the drivetrain comprises a moveable portion configured to engage with the inventory container and a support portion curved to retain the moveable portion against the inventory container while the inventory container advances through the inventory-handling apparatus.

* * * * *